US012081623B2

(12) United States Patent
Gabay et al.

(10) Patent No.: US 12,081,623 B2
(45) Date of Patent: Sep. 3, 2024

(54) NETWORK RESTRICTION CIRCUMVENTION MANAGEMENT

(71) Applicant: Comcast Cable Communications, LLC, Philadelphia, PA (US)

(72) Inventors: Benzy Gabay, Sunnyvale, CA (US); Albert Ribe Costa, San Mateo, CA (US); Carlo Treves, San Jose, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/474,792

(22) Filed: Sep. 14, 2021

(65) Prior Publication Data

US 2023/0084349 A1 Mar. 16, 2023

(51) Int. Cl.
*H04L 67/141* (2022.01)
*H04L 12/46* (2006.01)
*H04L 12/66* (2006.01)
*H04W 76/10* (2018.01)
*H04W 88/16* (2009.01)

(52) U.S. Cl.
CPC ........ *H04L 67/141* (2013.01); *H04L 12/4633* (2013.01); *H04L 12/4641* (2013.01); *H04L 12/66* (2013.01); *H04W 76/10* (2018.02); *H04W 88/16* (2013.01)

(58) Field of Classification Search
CPC ............... H04L 67/141; H04L 12/4633; H04L 12/4641; H04L 12/66; H04W 76/10; H04W 88/16
See application file for complete search history.

(56) References Cited

U.S. PATENT DOCUMENTS

| | | | |
|---|---|---|---|
| 7,855,982 B2 * | 12/2010 | Ramankutty | H04L 12/66 370/259 |
| 8,701,125 B2 | 4/2014 | Pillers | |
| 8,958,399 B1 * | 2/2015 | Hernacki | H04W 12/12 455/406 |
| 9,253,034 B1 * | 2/2016 | Krishnamurthy | H04L 41/0843 |
| 9,735,943 B2 | 8/2017 | Kalligudd | |
| 9,912,697 B2 | 3/2018 | Dorfman et al. | |
| 9,935,956 B1 * | 4/2018 | Cha | H04L 63/10 |
| 10,749,907 B2 | 8/2020 | Sinha et al. | |
| 10,958,662 B1 * | 3/2021 | Sole | H04L 63/0853 |

(Continued)

FOREIGN PATENT DOCUMENTS

WO WO-2015121617 A1 * 8/2015 .......... H04L 61/1511

*Primary Examiner* — Blake J Rubin
(74) *Attorney, Agent, or Firm* — Banner & Witcoff, Ltd.

(57) ABSTRACT

Systems, apparatuses, and methods are described for the management of network access. Implementations may utilize a data service, such as a virtual private network (VPN). A VPN may be configured to detect the situations in which a user may be attempting to circumvent a local network restriction. If a local network Wi-Fi gateway restricts Internet access, but a user device circumvents that gateway to reach another network, such as the VPN, via a different local connection (e.g., via a neighbor's Wi-Fi gateway, or a cellular data connection), then notifications may be sent to a controlling device, such as a parental device, which in turn can be used to deny access. A local gateway and/or a network connection management application comprising a VPN module on the user device may also cooperate in the detection of this circumvention.

21 Claims, 13 Drawing Sheets

(56) References Cited

U.S. PATENT DOCUMENTS

| | | |
|---|---|---|
| 11,134,058 B1* | 9/2021 | Sole ................ H04W 12/12 |
| 11,190,491 B1* | 11/2021 | Kaciulis ............ H04L 63/029 |
| 2001/0037466 A1 | 11/2001 | Fukutake et al. |
| 2009/0129271 A1* | 5/2009 | Ramankutty ........ H04L 12/66 370/235 |
| 2013/0017806 A1* | 1/2013 | Sprigg ................ H04M 1/66 455/411 |
| 2013/0232251 A1* | 9/2013 | Pauley .............. H04L 43/0876 709/224 |
| 2014/0173700 A1* | 6/2014 | Awan ................ H04L 63/107 726/4 |
| 2014/0321277 A1* | 10/2014 | Lynn, Jr. ............ H04L 41/0654 370/235 |
| 2015/0016280 A1* | 1/2015 | Stokking ............ H04L 49/351 370/250 |
| 2015/0120902 A1* | 4/2015 | Belz .................. H04W 12/08 709/224 |
| 2015/0188949 A1* | 7/2015 | Mahaffey .......... H04L 41/0894 726/1 |
| 2015/0350912 A1* | 12/2015 | Head .................. H04L 63/08 726/4 |
| 2016/0080322 A1* | 3/2016 | Prisser .............. H04L 63/102 726/1 |
| 2016/0173450 A1* | 6/2016 | Mircescu .......... H04L 41/0803 726/14 |
| 2016/0302132 A1* | 10/2016 | Patrikios ............ H04L 12/28 |
| 2016/0323307 A1* | 11/2016 | Savant .............. H04L 63/1425 |
| 2016/0330287 A1* | 11/2016 | Smith ................ H04L 61/4511 |
| 2016/0337206 A1* | 11/2016 | Bugenhagen ........ H04L 67/02 |
| 2017/0063929 A1* | 3/2017 | Burbridge .......... H04L 63/0876 |
| 2017/0104633 A1* | 4/2017 | Wen .................... H04W 24/02 |
| 2017/0149795 A1* | 5/2017 | Day, II .............. H04L 67/535 |
| 2018/0063185 A1 | 3/2018 | Fan et al. |
| 2019/0068554 A1* | 2/2019 | Austin .............. H04L 63/101 |
| 2019/0215308 A1* | 7/2019 | Feyzibehnagh ..... H04L 63/0428 |
| 2020/0187006 A1* | 6/2020 | Gary, Jr. ............ H04W 12/06 |
| 2020/0314067 A1* | 10/2020 | Rudnik .............. H04L 63/0272 |
| 2021/0168582 A1* | 6/2021 | Ceccarelli .......... H04W 28/24 |
| 2021/0250349 A1* | 8/2021 | Konda .............. H04L 9/3226 |
| 2021/0250629 A1* | 8/2021 | Viswanathan ... H04N 21/25816 |
| 2022/0103525 A1* | 3/2022 | Shribman .......... H04L 67/02 |
| 2022/0208319 A1* | 6/2022 | Ansari .............. H04L 65/1045 |
| 2022/0341743 A1* | 10/2022 | Bradley ............ G01C 21/3484 |

* cited by examiner

NETWORK RESTRICTION CIRCUMVENTION MANAGEMENT

BACKGROUND

Many users can connect electronic devices, such as laptops, mobile phones, etc., to a Wi-Fi gateway to access Internet resources. When network administrators or parents want to restrict network access, e.g., restrict a child's Internet access (e.g., at bedtime), they may configure the gateway to deny Internet access to devices associated with particular users. However, such users may react by accessing the Internet via alternative connections, such as a cellular data connection or a neighbor's Wi-Fi, thereby frustrating the efforts at controlling Internet access.

SUMMARY

The following summary presents a simplified summary of certain features. The summary is not an extensive overview and is not intended to identify key or critical elements.

Systems, apparatuses, and methods are described for the management of network access with the cooperation of a data service, such as a virtual private network (VPN). If a user pauses Internet access at a Wi-Fi gateway, but a device attempts to circumvent the pause and access the Internet anyway (e.g., by connecting to a different Wi-Fi gateway, or connecting through a cellular telephone data connection), then the device may prevent that Internet access from occurring. This may be accomplished with the installation of connection management software on the device, which can detect and block the circumvention attempt. However, some devices use operating systems that do not permit third-party software to access the network stack of the device, and such software may not be able to know if the device is attempting such a circumvention. To allow the detection of circumvention attempts for such devices, connection management software may establish a special VPN configuration, known as a loopback tunnel, on the device. The VPN loopback tunnel may be a VPN tunnel that begins and ends at the device. Such a VPN loopback tunnel need not actually affect the data passing through it, but since it is a VPN tunnel, the operating system will permit the connection management software to control the VPN loopback tunnel and, in effect, control whether Internet traffic will flow through the tunnel. The connection management software may monitor the VPN loopback tunnel and learn of circumvention attempts, and may control the VPN loopback tunnel to block Internet traffic if there is an Internet access pause at the Wi-Fi gateway. The connection management software may also detect attempts to alter a VPN configuration or uninstall a VPN application from the user device. This may be useful if, for example, a device attempts to create a new VPN tunnel to circumvent the pause. The connection management software may also alert a controlling device of such circumvention attempts.

A Wi-Fi gateway may also cooperate in the detection of this circumvention. For example, the Wi-Fi gateway may detect a user device, whose network access is restricted, disconnecting from the Wi-Fi gateway, and therefore infer that the user device is attempting to circumvent the local network restriction. The parent may be informed of this, and may take action such as restricting the user device's network connectivity at the VPN.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
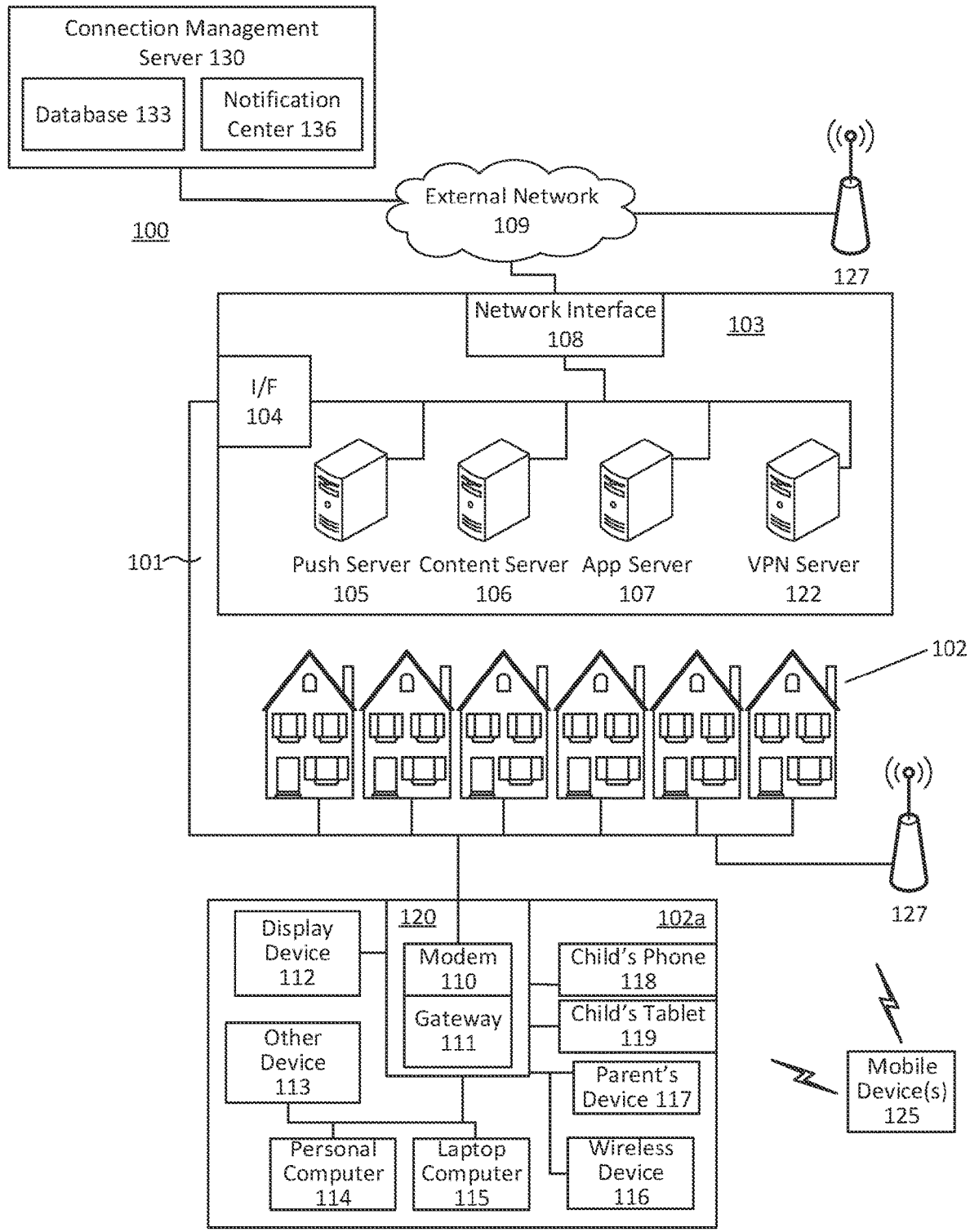
FIG. 1 shows an example communication network on which features described herein may be implemented.

The accompanying drawings show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE, 3G network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks (e.g., cellular networks such as 3G, LTE, 5G, local wireless such as WiMAX, satellite networks, etc.). The mobile devices 125 may comprise cellular phones, smartphones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the virtual private network (VPN) server 122 (described below), additional push, content, and/or application servers, and/or other types of servers. VPN server 122 may be a server configured to establish one or more VPN connections with one or more computing devices. After a device in the premise 102a establishes a VPN connection, inbound or outbound packets from the device to the external network is sent to the VPN server. Although shown separately, the push server 105, the content server 106, the application server 107, the VPN server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

The premises 102a may be a house owned by a family with two parents and a child. The parents own one or more parent's devices 117 and one child owns one or more child's devices 118. Each one of parent's device 117 and child's devices (e.g., child's phone 118, child's tablet 119) can be display devices 112 (e.g., televisions), other devices 113 (e.g., a DVR or STB), personal computers 114, laptop computers 115, wireless devices 116 (e.g., wireless routers, wireless laptops, notebooks, tablets and netbooks, Voice over Internet Protocol—VoIP phones, cordless phones (e.g., Digital Enhanced Cordless Telephone—DECT phones), mobile phones (e.g., cellular phones), mobile televisions, personal digital assistants (PDA)), landline phones, and any other desired devices. The network management described below may be used to control the child's devices (e.g., child's phone 118, child's tablet 119), with the help of the parent's device 117. Although "parent" and "child" are used as examples herein, the features herein may be implemented for desired types of devices.

The communication network 100 may also comprise a connection management server 130 to manage and facilitate the network management services described below. The connection management server 130 may further comprise one or more databases 133 and one or more notification centers 136. Database 133 may be used to store account information regarding subscribers of the network management service. The notification center 136 may be used to receive instructions and/or notifications from some devices associated with a subscriber. The notification center 136 may also, with the help of the database 133, process these instructions and/or notifications, for example, by authenticating these instructions and notifications, or by decrypting and encrypting the instructions or notification. Then, the notification center 136 may forward these instructions and/or notifications to other devices associated with the subscriber. Although illustrated as connected to an external network 109 outside of the premises 102a, the connection management server 130 may be located anywhere in the network, such as at the local office 103, at the premises 102a, etc.

Figure 2:
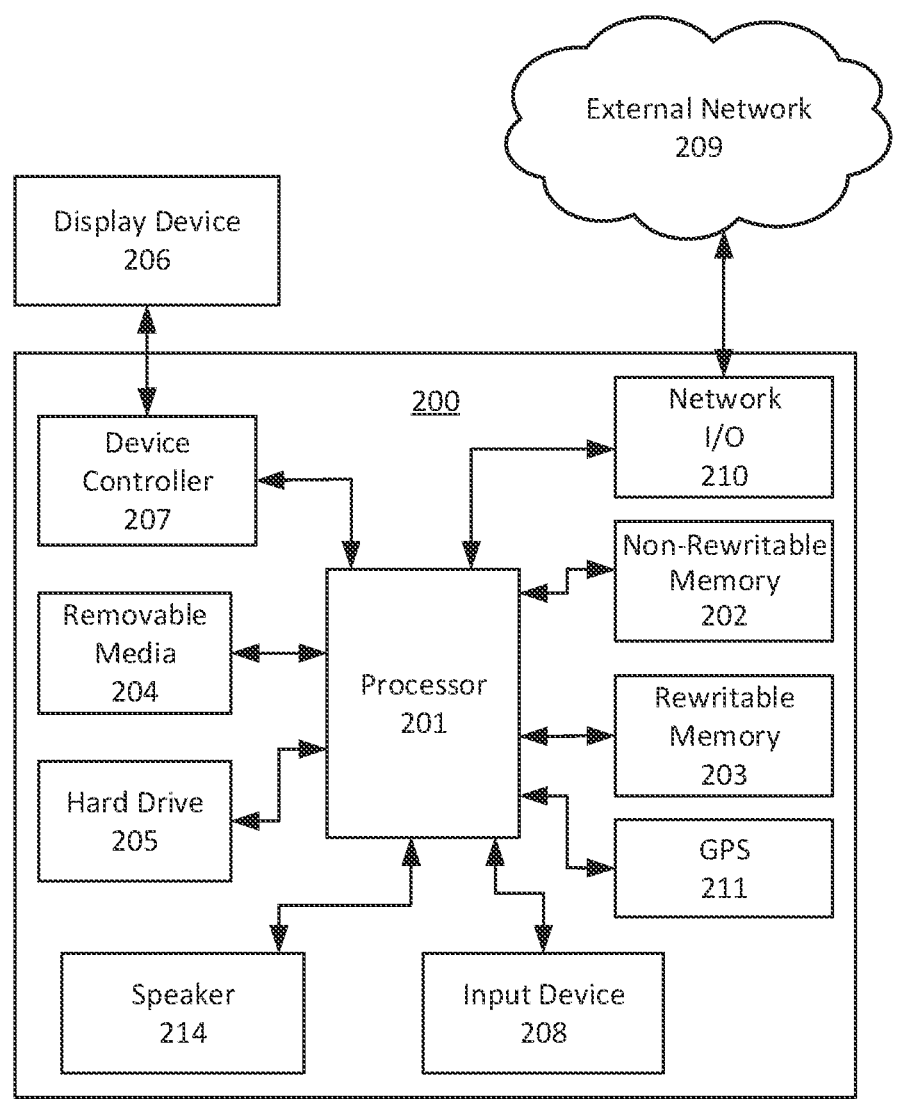
FIG. 2 shows hardware elements of an example computing device that may be used to implement any of the elements described herein.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., the database 133 and the notification center 136). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented via one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
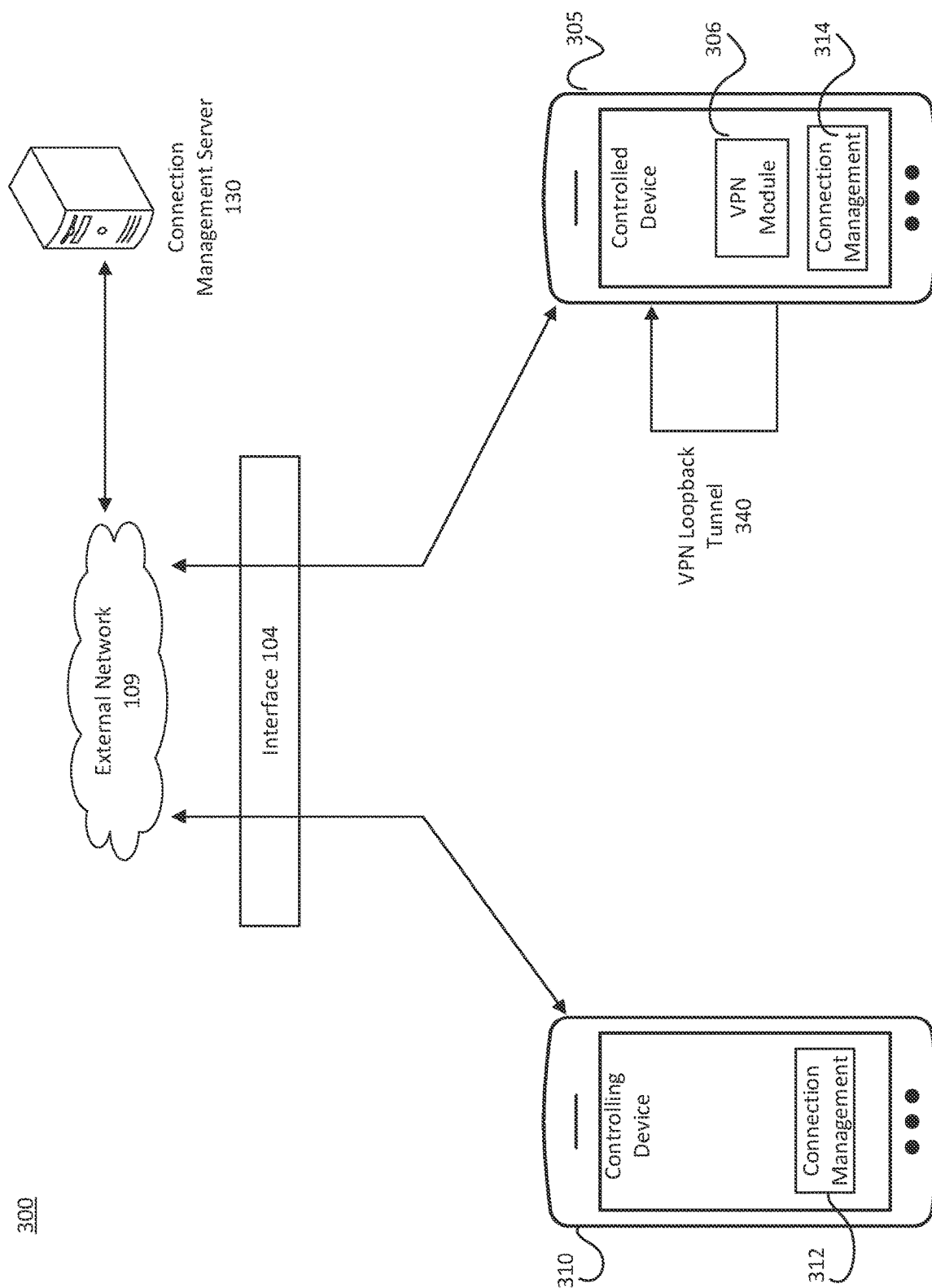
FIG. 3 shows an example of a network management system that may implement network restriction circumvention management.

FIG. 3 shows an example of a network management system 300 that may implement network restriction circumvention management described herein. The network management system 300 may comprise at least one or more controlling devices 310 (e.g., parent device 117), and one or more controlled device 305 (e.g., child's phone 118 or child's tablet 119). A network connection management application 312 may be installed on the controlling device 310, and a network connection management application 314 may be installed on the controlled device 305. The applications may comprise one or more application programming interfaces (APIs) configured to communicate and/or interact with one or more APIs associated with an operating system of the computing devices where the application operates. The network connection management application 312 on the controlling device 310 and the network connection management application 314 on the controlled device 305 may comprise the same modules or may comprise different modules. For example, the network connection management application 314 may comprise a VPN module 306, which may be optionally not comprised in the network connection management application 312. The VPN module 306 may be configured to establish and maintain a VPN connection between the controlled device 305 and an external VPN server 122 for communications via a VPN tunnel. However, as will be discussed below, the network connection management application 314 may use the VPN module 306 to establish a VPN loopback tunnel 340. The VPN loopback tunnel 340 may originate with the controlled device 305 and also terminate at the controlled device 305. Outgoing data from the controlled device 305 may pass through the VPN loopback tunnel 340 before being sent outside of the device 305 to the interface 104, to external network 109, and to any other destination. As depicted above in FIG. 1, the interface 104 may comprise one or more computing devices configured to send information downstream to, and to receive information upstream from, the controlled device 305 and/or the controlling device 310, via one or more wireless access points 127 (e.g., one or more LTE/3G base stations) and/or gateways 111. Incoming data may also pass through the VPN loopback tunnel 340 before being delivered to applications (e.g., a web browser) within the controlled device 305. The VPN loopback tunnel 340 may be a simple passthrough tunnel, and the data need not be encrypted to traverse the VPN loopback tunnel 340. Note that the configuration in FIG. 3 is merely an example, and variations may be made as desired.

The VPN loopback tunnel 340 may be advantageous if the controlled device 305 does not otherwise permit the network connection management application 314 to access the network communications stack of the controlled device 305. Some operating systems, such as the IOS™ and ANDROID™ operating systems, do not permit third-party applications (e.g., applications not provided by the maker of the operating system or the controlled device 305) to access the communication network stack. However, those operating systems do permit third-party applications to access and control VPN tunnels. The network connection management application 314 may access the VPN module 306 to obtain information about data traffic that is passing through (or attempting to pass through) the VPN loopback tunnel 340. The network connection management application 314 may send commands to the VPN module 306 to stop data traffic from using the VPN loopback tunnel (packets may be buffered or dropped instead of passing through the VPN loopback tunnel 340), and may also receive information from the VPN module 306 indicating the arrival of incoming and/or outgoing data, changes to the VPN loopback tunnel 340 configuration, etc.

Via the network connection management application 312, the controlling device 310 may be configured to exercise network restriction on the controlled device 305. For example, the network restriction may comprise pausing Internet (or other networks) access of the controlled device 305. If a network administrator, e.g., a parent in a household, wants to pause the Internet access of the controlled device 305, she may use the controlling device 310 to send an instruction to pause Internet access of the controlled device 305. The instruction to pause may be sent to the network connection management application 314 on the controlled device. If both the controlling device 310 and the controlled device 305 are connected with a local gateway 111, the instruction to pause may also be sent to the gateway 111. The local gateway 111 and the network connection management application 314 may act to restrict the controlled device 305's network accessibility and detect events that may indicate that the user of the controlled device 305 is attempting to circumvent the network restriction, as described in further detail in FIGS. 4A-4B and FIG. 5.

For example, the controlling device 310 may be the parent's device 117 in premises 102*a*, and the controlled device 305 may be a child's device (e.g., child's phone 118, and/or child's tablet 119), and both devices may be connected to the gateway 111. When it is bedtime, the parent may want to pause the child's Internet access. To do this, the parent may send an instruction to pause, from the network connection management application 312 running on the parent's device 117, to the gateway 111 and the network connection management application 314 on the controlled device 305. In this way, even if the child may have been sophisticated enough to circumvent the parent's local network restriction by disconnecting the controlled device 305 from the gateway 111 and connecting it to a neighbor's Wi-Fi gateway, or a cellular network base station, the Internet service to the controlled device 305 may still be blocked by the controlled device 305. This may be useful if, for example, the parent has no control over the neighbor's gateway or the cellular base station. The gateway 111 and the controlled device 305 may detect potential circumvention events and react to manage the network restriction, which is described in FIG. 4 and FIG. 5 in further detail.

The controlling device 310 may communicate with (e.g., send instructions to or receive alerts from) the controlled device 305 via a direct connection (e.g., Bluetooth), via gateway 111, or via the connection management server 130 (as may be described in FIG. 1).

Besides an instruction that pauses the Internet access of the controlled device 305 entirely, the network restriction may also be configured as a restriction profile (e.g., a data file storing information indicating network restriction preferences). A restriction profile may be maintained by network connection management application 312/314, and may be applied to one particular controlled device 305, or may be applied to multiple controlled devices 305.

The restriction profile may indicate that the controlled device 305 is prohibited from accessing certain sources on the Internet following the issuance of a general instruction to pause. The restriction profile may also comprise an access schedule. For example, an access schedule of a child's phone 118 may indicate that during school hours, from 9 AM-4 PM, the child's phone 118 may only access websites providing certain online courses. After school hours, from 4 PM-10 PM, all sources may be accessed. From 10 PM to 9 AM, when the child is expected to be asleep, no network sources are allowed to be accessed at all. The schedule may be stored in the controlling device 310, controlled device 305, and/or on any of the network components involved in the network management system 300, and corresponding instructions may be generated by that network component based on the current time and the schedule.

The restriction profile may also indicate an application-specific network restriction (instead of, or in addition to, a device-based network restriction that restricts the network access of the entire controlled device 305) on the controlled device 305. For example, it may indicate that only certain applications on the controlled device 305 are to be paused following the issuance of a general instruction to pause. For example, the network administrator may configure the restriction profile so that only the network access of certain social media applications and online game applications is to be paused, while other applications may be allowed to access the Internet even during the time period when a general instruction to pause is in effect.

Application-specific restrictions may be enforced using application identifiers (IDs) in network traffic. An application ID may be comprised of packets that are sent from/to the application. The application ID may be an address of the application, or any unique ID assigned to the application.

If the gateway 111 receives a packet from/to the controlled device 305 during the time period when the network access of the controlled device 305 is paused, the application ID in the packet may be identified and a determination of whether the packet should be dropped or delayed may be made based on the restriction profile. If the application ID comprised in the packet is associated with an application that should be paused based on the restriction profile, the gateway 111 may determine to drop or delay the packet. This may also be done by the connection management application 314, which may close the VPN loopback tunnel 340 during a network pause, or configure the tunnel to only permit traffic for approved applications.

The operation of an application-specific network restriction may otherwise be similar to a device-based network restriction. Therefore, the description in FIGS. 4A-4B and FIG. 5 generally apply to both an application-specific network restriction and a device-based network restriction.

Figure 4A:
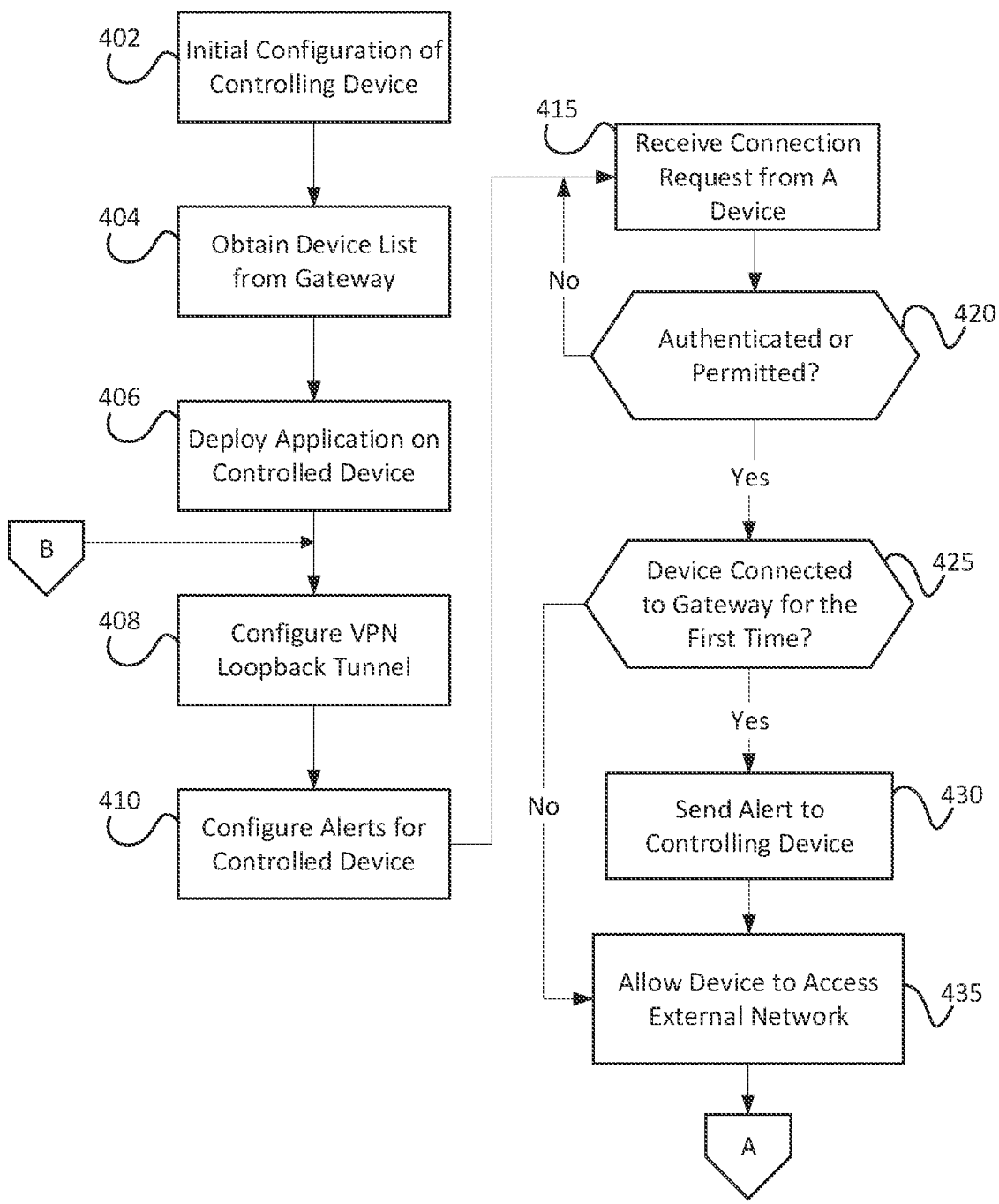
FIGS. 4A-4B is a flow chart showing an example method for network restriction circumvention management.
Figure 4B:
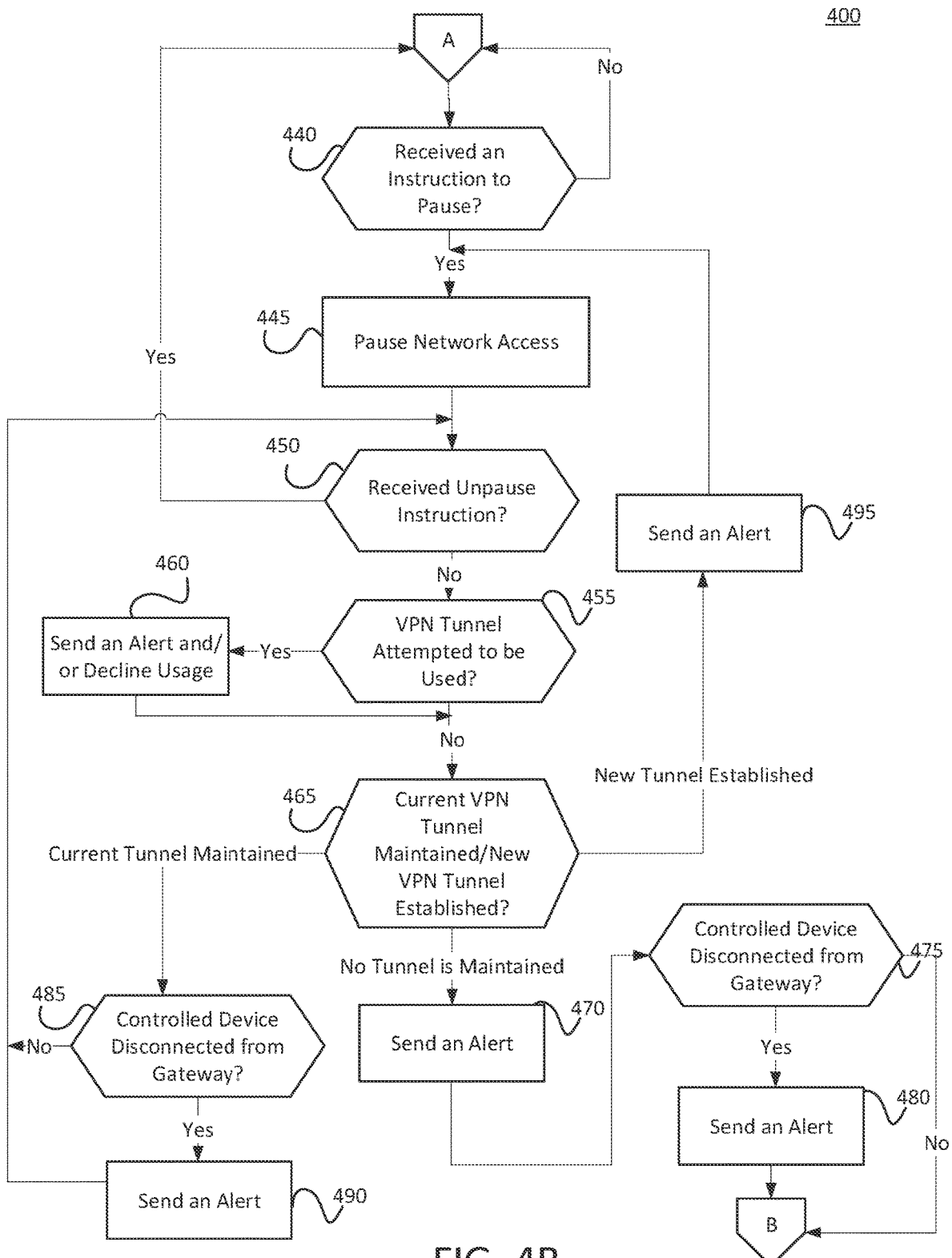

FIGS. 4A-4B depicts a flowchart showing an example method for network restriction circumvention management. Some or all of the steps of method 400 may be performed by one or more computing devices as described herein, including, for example, computing device 200, controlling device 310, controlled device 305, gateway 311, connection management server 130, and/or other computing devices in FIG. 1 or FIG. 3.

In step 402, a network administrator may make, via connection management application 312, initial configurations on one or more controlling devices 310 of the network management system 300. For example, the network administrator may be a parent in premises 102a, and the network restriction may be imposed on the child's devices (e.g., child's phone 118, child's tablet 119) to pause its Internet access during bedtime as described in FIG. 3. The network administrator may register an account to subscribe to the network management service and may be assigned an account number. The account information may be stored in an account management storage space, for example, in the connection management server 130. The account may either be associated with other accounts relating to network service, for example, the home Wi-Fi service provided by the gateway 111, or be independent of other services.

The network administrator may associate one or more controlling devices 310 with the account. The controlling device 310 may have the authority to impose network restriction on other devices associated with the account. To associate the controlling device 310 to the account, the network administrator may download a network connection management application 312 on her device and register her device as a controlling device 310 by logging in to application 312. During the registration, the device ID of the controlling device 310 may be added to the account information. For example, the device ID may be the device's media access control (MAC) address, the device's Internet Protocol (IP) address, the device's universally unique identifier (UUID) or an identifier that is assigned to the device during the registration.

Figure 6A:
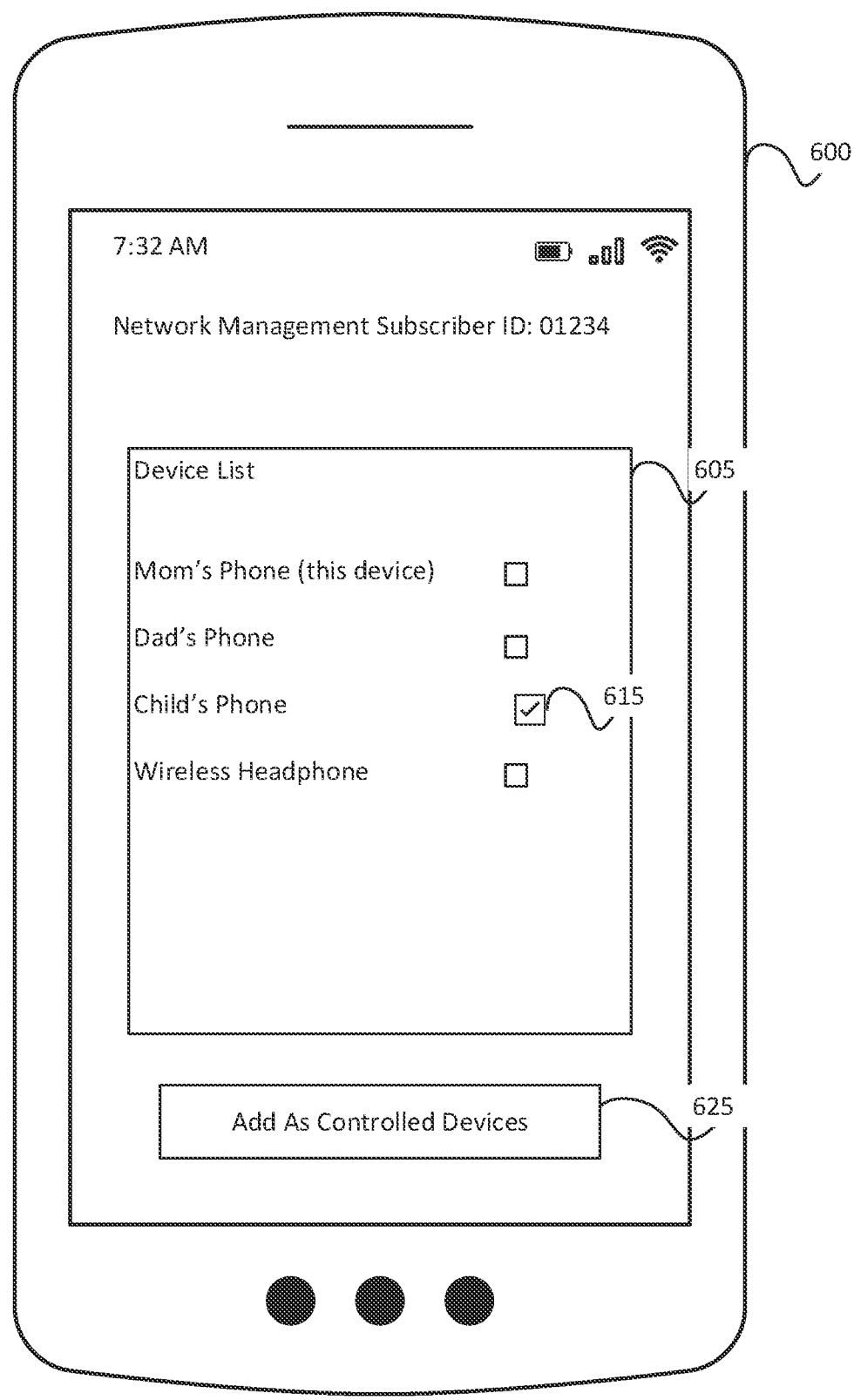
FIGS. 6A-6C illustrate exemplary screen displays to configure network restriction circumvention management on a computing device.

In step 404, after the controlling device 310 is registered, the network connection management application 312 may obtain a device list that lists devices that are connected to the gateway 111 and show the device list to the network administrator. The network administrator may choose to add one or more devices on that list as a controlled device 305. For example, FIG. 6A shows a screen display on the mom's phone 600 (e.g., controlling device 310) after her registration. The interface of the network connection management application 312 may show a device list 605, which may list devices that are connected to the gateway 111. The mom's phone, the dad's phone, the child's phone, and the wireless headphone are currently on the list 605. For example, these devices may be any of the devices 112-118 shown in FIG. 1. The mom may check checkbox 615 next to the "child's phone" and then click the "Add as Controlled Devices" button 625.

In step 406, a network connection management application 314 may be deployed on the controlled device 305. The deployment may be conducted by the gateway 111, the connection management server 130, or any other computing device in the network management system 300. The deployment may be made by sending a link to the controlled device 305 to invite the controlled device 305 to download the network connection management application 314. Or, the deployment may be made by pushing the network connection management application 314 to the controlled device 305.

In step 408, a VPN loopback tunnel 340 may be configured, so that the network traffic to/from the controlled device 305 may pass through the VPN loopback tunnel 340. The VPN loopback tunnel 340 may be established and maintained by the VPN module 306 at the direction of the network connection management application 314.

In step 410, the network administrator may configure alerts that she would like to receive if the user of the controlled device 305 attempts to circumvent any network restriction. For example, FIG. 6B shows a list of alert-setting options displayed on the mom's phone 600 regarding the child's phone 118. For example, there may be a general option 655 that indicates "sending an alert if any potential circumvention is detected." If the mom checks this checkbox, all the checkboxes below may be automatically checked. The mom may also select some alerts if certain type of potential circumvention is detected. For example, option 660 may indicate "sending an alert if potential circumvention is detected by Home Gateway," option 665 may indicate "sending an alert if the VPN loopback tunnel is disabled," option 670 may indicate "sending an alert if the VPN loopback tunnel was attempted to be used." Other alerts described below may also be shown as an alert option here. A manner in which each network component may detect potential circumvention events is described in further detail below in both FIGS. 4A-4B and FIG. 5. Besides options 665-670, there may be another option 650 that is independent of any potential circumvention event made by a particular controlled device 305. For example, option 650 may indicate "sending an alert if a new device is connected to Home Gateway for the first time." The alert settings may be changed from time to time as the network administrator needs.

Alerts may also be configured for new devices that connect to the gateway 111 after the initial configuration. In step 415, a connection request may be received from a device that wishes to connect to the gateway 111. The connection request may be, for example, a wireless network connection request from a new tablet the child borrows from a friend, as it attempts to connect to a wireless network of the gateway 111.

In step 420, the gateway 111 may determine whether the connection request should be allowed by determining whether the new device is authenticated or permitted. The gateway 111 may authenticate the request by using the information contained in the request itself, such as a password. The gateway 111 may forward the request to the controlling device 310 to ask for permission, for example, by sending a push notification to the network connection management application 312 on the controlling device 310. Or, the gateway 111 may wait for input on the gateway 111 as permission. If the connection request is neither authenticated nor permitted, then the connection request may be denied and the gateway 111 may wait for new connection requests.

If the request is authenticated or permitted, then in step 425, a determination may be made as to whether the device is a new device that is connected to the gateway 111 for the first time, or the device had been connected to the gateway 111 previously. To do that, the gateway 111 may store information regarding the connection history of devices that had been previously connected with the gateway 111, and the determination may be based on that information. The information may involve the connection history for a certain previous amount of time, for example, the previous thirty days. In such an example, if the device connected to the gateway 111 sixty days ago but then has not connected to the gateway 111 ever since, then the gateway 111 may regard the device as a new device connected to the gateway 111 for the first time. If the device had been connected to the gateway 111 previously, then step 435 may be performed. If the device is connected to the gateway 111 for the first time, then step 430 may be performed.

In step 430, an alert may be sent to the controlling device 310 indicating that a new device is connected to the gateway 111 for the first time. The alert may help the parent decide if further action should be taken regarding restricting network access. For example, if the child borrows a friend's tablet and brings it home so that he could use it and circumvent the network restriction, the mom may be able to learn it in this way. By contrast, if the dad comes back from home and his phone is connected to the gateway 111, such an alert may not be sent based on the information that the dad's phone had been connected to the gateway 111 previously. The alert 430 may cause the mom to undergo the configuration in steps 406-410 for the new device.

Figure 6B:
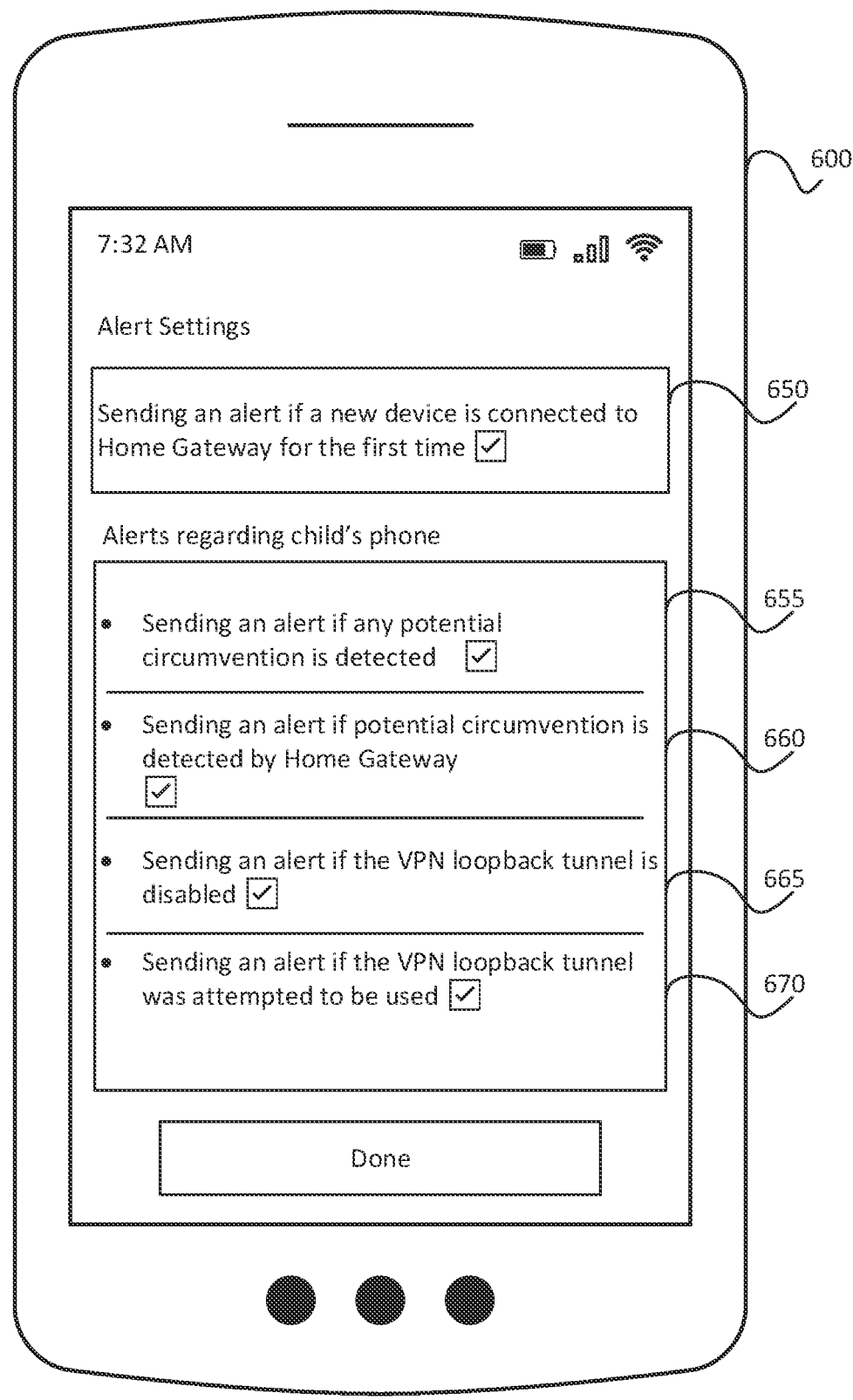
Figure 6C:
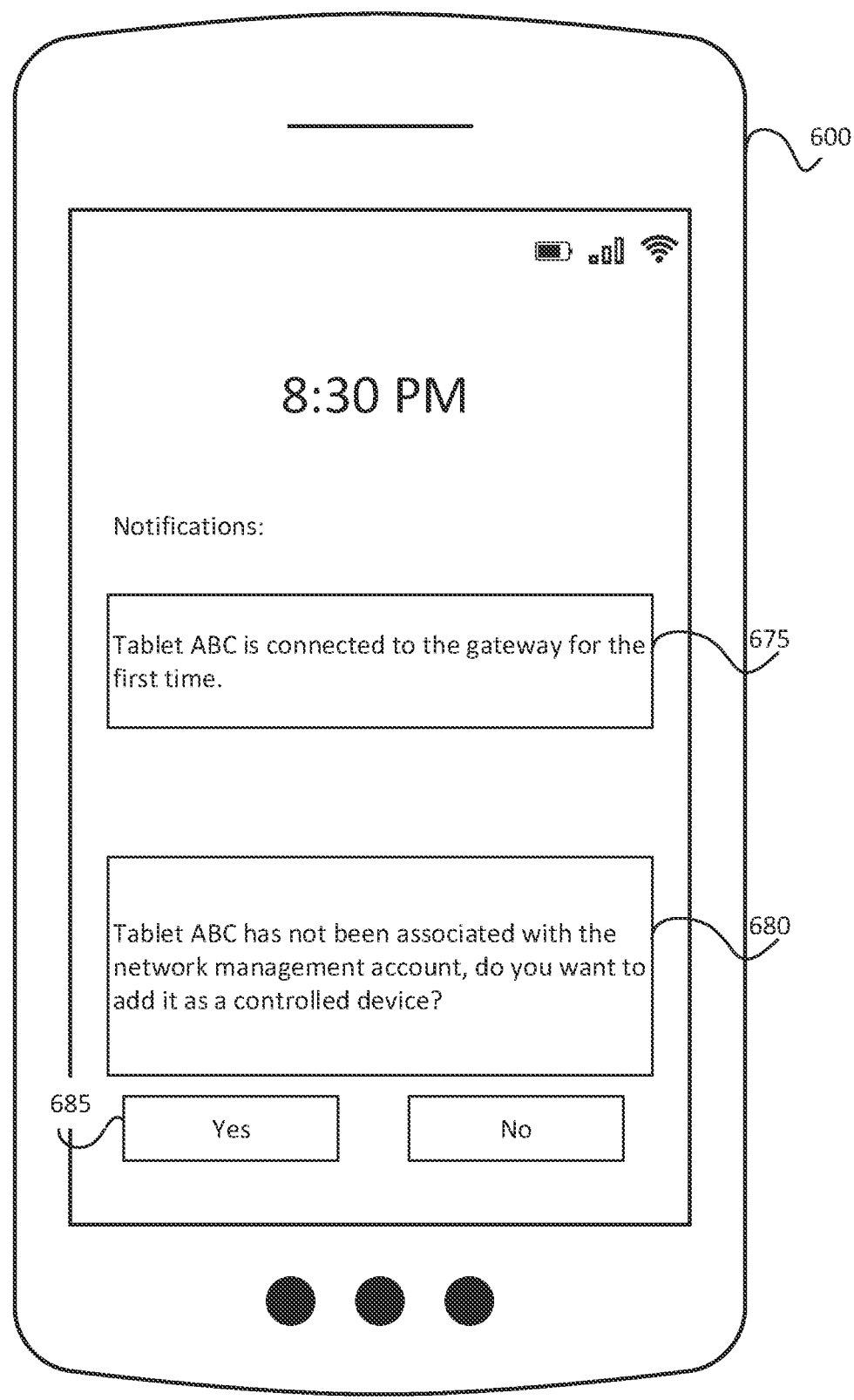

After determining the new device is connected to the gateway 111 for the first time, the gateway 111 may communicate with the connection management server 130 that stores the network management account information, to inquire that, before connecting to the gateway 111, whether the new device has been associated with the network management account, and if it has been associated, whether a VPN loopback tunnel 340 has been established. If the new device has not been associated with the network management account, or a VPN loopback tunnel 340 has not been established, then a prompt may also be sent to the controlling device 310, to configure network pause settings for the new device, for example, to add the new device as a controlled device 305. For example, as it is shown in FIG. 6C, after the child connects his friend's tablet to the gateway 111, the mom may receive two messages. The first message 675 may be to inform her that "Tablet ABC is connected to the gateway for the first time." The second message 680 may be to inform "Tablet ABC has not been associated with the network management account" and ask "do you want to add it as a controlled device?" If the mom presses the "Yes" button 685, a network connection management application 314 may be deployed on the controlled device 305. After the network connection management application 314 is deployed on the new tablet, a VPN loopback tunnel 340 may be configured in a way similar to step 408, and then alerts may be configured in a way similar to step 410.

If the device has been connected to the gateway 111 previously, or the network administrator had completed the network management configuration regarding the new device or has determined to skip the configurations, the method may proceed to step 435. In step 435, the gateway 111 may allow the device to access the Internet, and normal Internet requests and responses may be processed.

In step 440, a determination may be made as to whether an instruction to pause the network access of the one or more controlled device 305 is received. The instruction to pause may be sent from the controlling device 310 to the gateway 111 and/or the controlled device 305. The controlled device 305 that is paused may be the new device described in step 415 to step 435, or may be another device that has previously been registered. The controlled device 305 may be connected to the gateway 111, or may be connected to another gateway or cellular data service at the time when the instruction to pause is received.

Figure 7A:
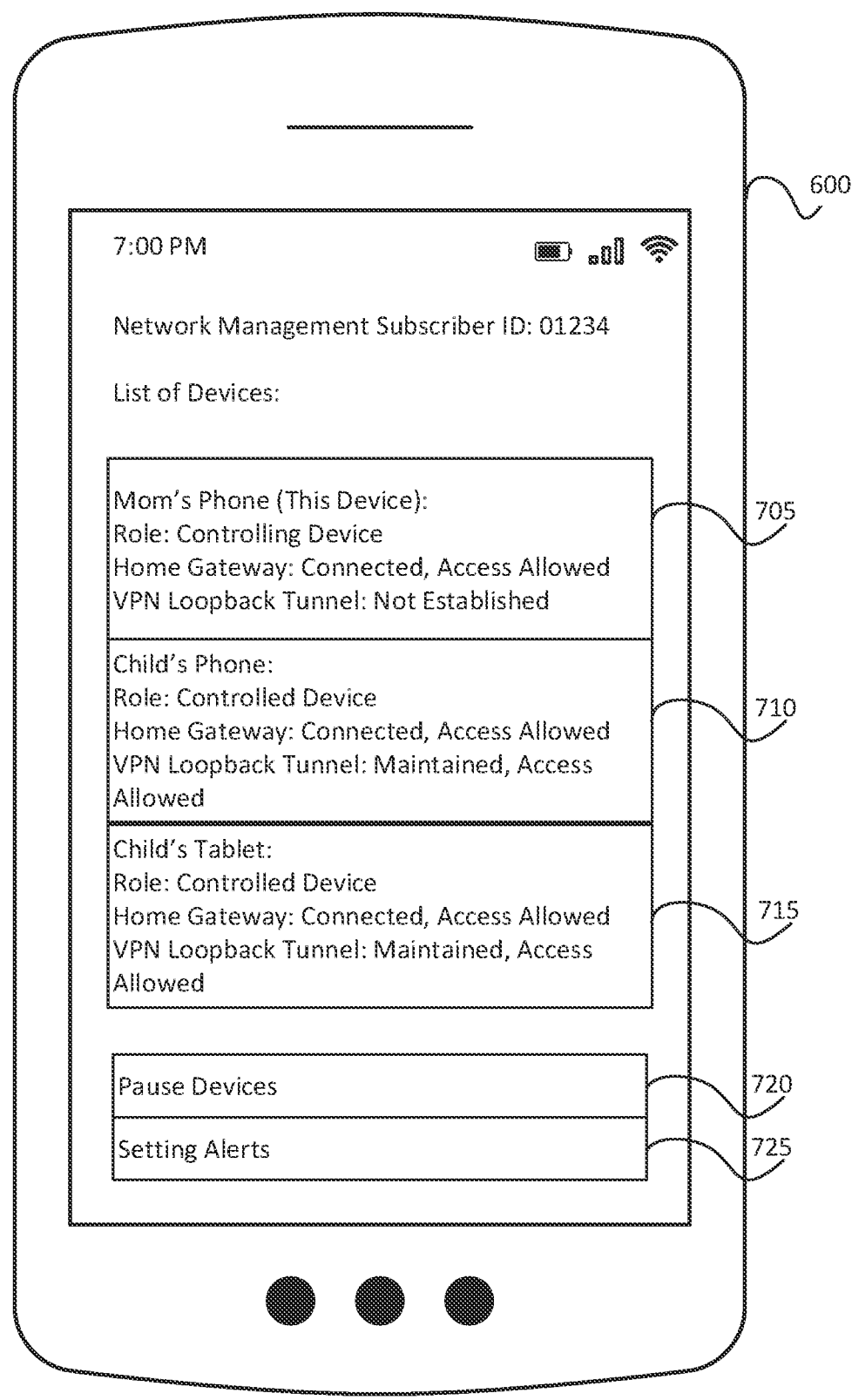
FIGS. 7A-7D illustrate exemplary screen displays to configure network restriction on a computing device.
Figure 7B:
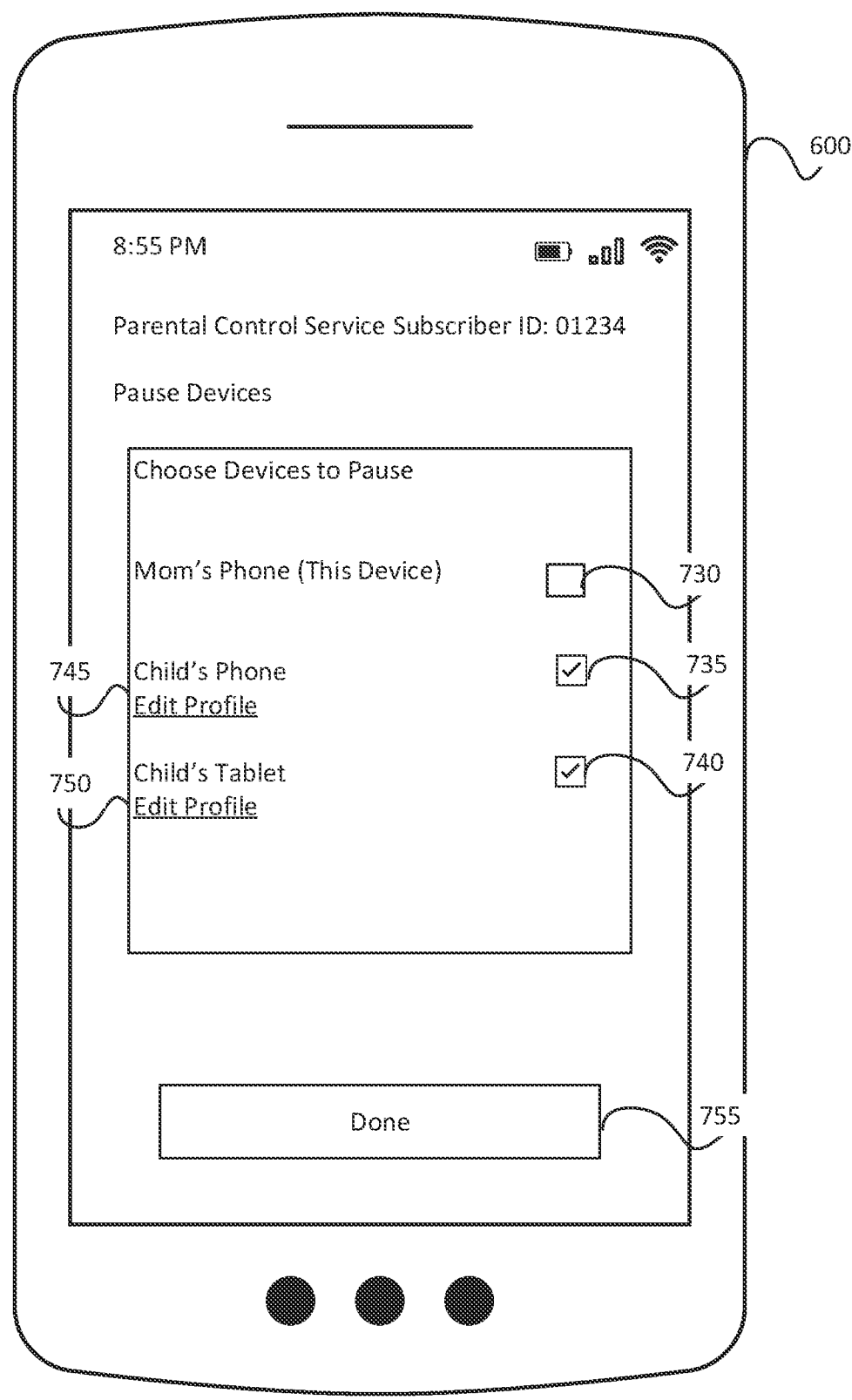
Figure 7C:
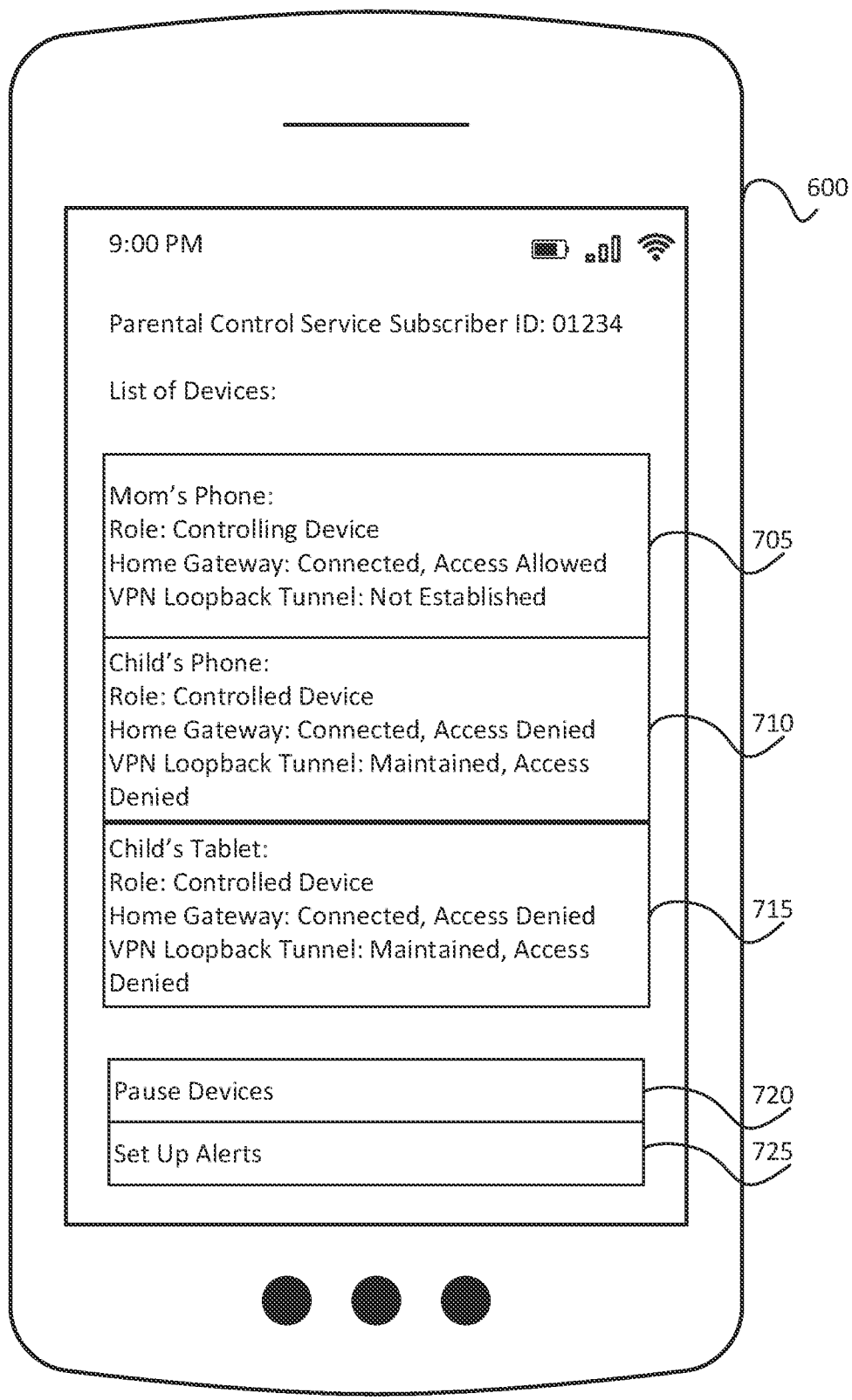

FIGS. 7A to 7C show screen displays on a controlling device 310 to pause the network access of one or more controlled devices 305. For example, on premises 102a, it is bedtime and the mom may want her child to stop playing with any of his electronic devices. In FIG. 7A, the mom may open the network connection management application 312 on her phone 600. The screen on the mom's phone 600 may show her account information, "network management subscriber ID: 01234" on the top, and then a list of devices that are associated with the account, which had been previous registered during either step 408 or step 430. The devices within the network management system 300 may comprise a mom's phone 600, a child's phone 118, and a child's tablet 119. The mom's phone 600 may be a controlling device 310. The child's phone 118 and the child's tablet 119 may be two controlled devices 305 whose network access is subject to control by the mom's phone 600. The device list may also comprise three items, 705, 710, and 715, each item may indicate a current status of the network connectivity of a device. Currently, all three devices may be connected to their home Wi-Fi gateway 111. Access to the network may be allowed for all three devices. A VPN loopback tunnel 340 may have been configured on the child's phone 118 and child's tablet 119. Access to the network via the VPN loopback tunnel 340 on both devices is allowed. The mom's phone 600 may not have a VPN loopback tunnel 340 because she does not need network management on her own device. At the bottom of the screen, there is a "Pause Devices" button 720 to pause the network access of the devices, and a "Setting Alerts" button 725 that may allow the mom to either configure or change the alerts she wants to receive for each device. If the mom clicks the "Setting Alerts" button 725, she may be shown a screen similar to FIG. 6B. Now, she may press the "Pause Devices" button 720.

In FIG. 7B, the screen display may show a list of device names or IDs, with a checkbox (e.g., checkbox 730, 735, or 740) next to each device name/ID. The mom may click the checkboxes to choose which devices she wants to pause. The mom may check checkbox 735 next to the child's phone 118 and the checkbox 740 next to the child's tablet 119, and then press the "Done" button 755. The network connection management application 312 may determine that the access of the child's phone 118 and the child's tablet 119 should be paused. An instruction to pause may be sent to the gateway 111 and the controlled device 305. For each of the controlled devices 305 (e.g., the child's phone 118 or child's tablet 119), there is also an "Edit Profile" button below the device's ID. For example, an "Edit Profile" button 745 is below the device ID "Child's Phone," and another "Edit Profile" button 750 is below the device ID "Child's Tablet." If the mom clicks one of the buttons, she may configure a restriction profile discussed in FIG. 3. For example, she may configure an application-specific restriction. For example, if she clicks the "Edit Profile" button 745, she may be shown a list of application names associated with applications on the child's phone 118, and she may choose which applications are to be paused following the issuance of a general instruction to pause.

FIG. 7C may show an example screen display on the mom's phone 600 after the mom completed the settings depicted in FIG. 7B and pressed the "Done" button 755. Item 710, which indicates the current status of the network connectivity of the child's phone 118, may be updated to indicate that child's phone 118 is still connected to the gateway 111 but the access is denied. Item 710 may also be updated to indicate that the VPN loopback tunnel 340 on the child's phone 118 is still maintained but the network access is also denied. Similarly, item 715, which indicates the current status of the network connectivity of the child's tablet 119, may be updated to indicate that child's tablet 119 is still connected to the gateway 111 but the access is denied. Item 715 may also indicate that the VPN loopback tunnel 340 on the child's tablet 119 is still maintained but the access is also denied.

Turning back to FIGS. 4A-4B, if the instruction to pause is received, the method may proceed to step 445.

In step 445, the gateway 111 and the network connection management application 314 may pause the network access of the controlled device 305 respectively.

An instruction to pause may be sent to the VPN module 306, to cause it to close or modify the VPN loopback tunnel 340 to block future network traffic as described herein. The VPN module 306 may operate with network resources (e.g., a network stack) of the controlled device 305 to cause future traffic to be blocked at the VPN loopback tunnel 340. This may entail closing the tunnel entirely, or leaving it active to allow certain types of traffic to still traverse the tunnel during the network pause. One type of traffic, which will be discussed further below, is an eventual unpause instruction that the mom may send after dinner.

After the instruction to pause is received by the gateway 111, if the gateway 111 receives outbound packets sent from the controlled device 305 or inbound packets sent from the Internet to the controlled device 305, the gateway 111 may either drop those packets or delay sending those packets by storing the packets to be sent after the access is re-allowed later on.

If the gateway 111 determines to drop those outbound or inbound packets associated with the controlled device 305 (e.g., because the packets are destined for, or received from, a source that is to be blocked during the network pause), it may send an alert to the controlling device 310. The alert may indicate that the controlled device 305 attempted to access the Internet. It may also send notifications to the controlled device 305 indicating the access is denied because of the local network restriction.

At step 450, a determination may be made as to whether an unpause instruction is received. For example, the unpause instruction may be received by the gateway 111 and/or the controlled device 305. If the unpause instruction is received, the gateway 111 and/or controlled device 305 may re-allow the network access of the controlled device 305. For example, if the unpause instruction is received by the controlled device 305, the VPN module 306 may reopen the VPN loopback tunnel 340 to allow network access to the controlled device 305.

While the pause instruction remains in effect, the VPN loopback tunnel 340 may allow the unpause instruction to pass through so that the network connection management application 314 may process the unpause instruction, even if the VPN loopback tunnel 340 may drop other packets. The unpause instruction may use a unique network protocol. The pause instruction discussed above may indicate packets that use the unique network protocol can pass through the VPN loopback tunnel 340. The VPN loopback tunnel 340 may allow the unpause instruction to pass through based on the network protocol that the unpause instruction uses.

After the network access is unpaused, the method may return back to step 440 to wait for another instruction to pause.

If it is determined that no unpause instruction has been received, the method may proceed to step 455. In step 455, a determination may be made as to whether the VPN loopback tunnel 340 has attempted to be used. For example, the VPN loopback tunnel 340 may be attempted to be used if a request to use the VPN loopback tunnel 340 (e.g., to access the Internet) has been made from an application on the controlled device 305, or if an incoming packet from the Internet has been received by the VPN loopback tunnel 340. The VPN module 306 may be in constant communication with the network resources of the controlled device 305, and may be informed of any traffic that arrives via the tunnel or is requested to be sent via the tunnel.

If it is determined that the VPN loopback tunnel 340 has been attempted to be used, the method may proceed to step 460. In step 460, an alert may be sent (e.g., from the network connection management application 314) to the controlling device 310 to indicate that the controlled device 305 has attempted to circumvent the pause in the network access. The usage of the VPN loopback tunnel 340 may be declined, based on a determination that the instruction to pause remains in effect. For example, the outgoing request or the incoming packet may be dropped or buffered. If the pause in the network access is application specific, the VPN loopback tunnel 340 may be used to only permit sending and receiving packets, for the controlled device 305, that is associated with applications that are not paused. As described in FIG. 3, such packets may be identified, for example, by their sender and/or recipient addresses, or by an application ID in the packets. If it is determined that the VPN loopback tunnel 340 has not been attempted to be used, or after step 460 is performed, the method may proceed to step 465. In step 465, a determination may be made as to whether the current VPN loopback tunnel 340 is maintained, and/or whether a new VPN loopback tunnel 340 is established.

If it is determined that no VPN loopback tunnel 340 is maintained, the method may proceed to step 470, since tearing down the VPN loopback tunnel 340 may be an indication that the child is attempting circumvent the network pause. For example, the user of the controlled device 305 may have either logged in to the network connection management application 314 to disable the VPN loopback tunnel 340 manually, or may have uninstalled the network connection management application 314.

In step 470, an alert may be sent to the controlling device 310 indicating the VPN loopback tunnel 340 is disabled or indicating the network connection management application 314 is uninstalled.

In step 475, a determination may be made as to whether the controlled device 305 is disconnected from the gateway 111. A disconnection from the gateway 111 may occur, for example, if the user (e.g., the child) decides to connect their device to a neighbor's gateway, and as a result, disconnects from the gateway 111. The determination may be useful because, after the VPN loopback tunnel 340 is disabled, if the controlled device 305 still connects to the gateway 111, then the gateway 111 may still be used to pause the network access of the controlled device 305. However, if the controlled device 305 is no longer connected to the gateway 111, the gateway 111 may no longer be able to exercise the network restriction.

The disconnection may be detected by the gateway 111 during the time period while the pause remains in effect. For example, the gateway 111 may send out Internet Control Message protocol (ICMP) messages periodically to the controlled device 305 to request the controlled device 305 to confirm the connection is maintained. If no periodic response is received for a certain amount of time, it may be determined that controlled device 305 is disconnected from the gateway 111. For example, the controlled device 305 may have turned off the Wi-Fi connection and used a cellular network base station to access the Internet. Or, the controlled device 305 may have connected to a neighbor's Wi-Fi whose service is not controllable by the network administrator, e.g., the parent.

If it is determined that the controlled device 305 is disconnected from the gateway 111, the method may proceed to step 480. In step 480, an alert may be sent (e.g., by the gateway 111) to the controlling device 310 indicating that the controlled device 305 is disconnected from the gateway 111. An example of such an alert may be seen in FIG. 7D, which will be described further below. Consistent with what is depicted in FIG. 7C, if the mom opens the network connection management application 312 on her phone 600 after the child's phone is disconnected from the gateway 111, item 710, which indicates the current status of the network connectivity of the child's phone 118, may be updated (not shown in FIG. 7C) to indicate that the child's phone 118 is disconnected from the gateway 111.

To avoid false alarms (e.g., if a child obediently turns their device off at bedtime, then the parent does not necessarily need an alert regarding the disconnection), a delay time period may be employed before sending the alert in step 480. In order to reduce unnecessary alerts, an alert may only be sent if the time between the network access is paused and the controlled device 305 is disconnected exceeds the delay time period. For example, the delay time period may be 20 minutes. If the mom pauses the Internet access of the child's phone 118 at 9 PM when the mom asked the child to go to bed, and the child obediently turned off the phone at 9:05 PM, five minutes later, then the disconnection may not indicate a circumvention attempt. And therefore, an alert may not be sent in this situation. However, if the child's phone 118 is disconnected from the gateway 111 at 10:30 PM, it may be likely to indicate that the child gets up from the bed and then connects to a neighbor's Wi-Fi to play again. An alert may be sent in this situation. This feature may be optional, and the parent may choose to receive alerts without such a delay period.

If it is determined in step 475 that the controlled device 305 has not been disconnected from the gateway 111, or if step 480 has been performed, the method may return back to step 408, where the network administrator (e.g., the parent) may configure a VPN loopback tunnel 340 again if she wants to continue using the VPN loopback tunnel 340 to manage the network access.

Figure 7D:
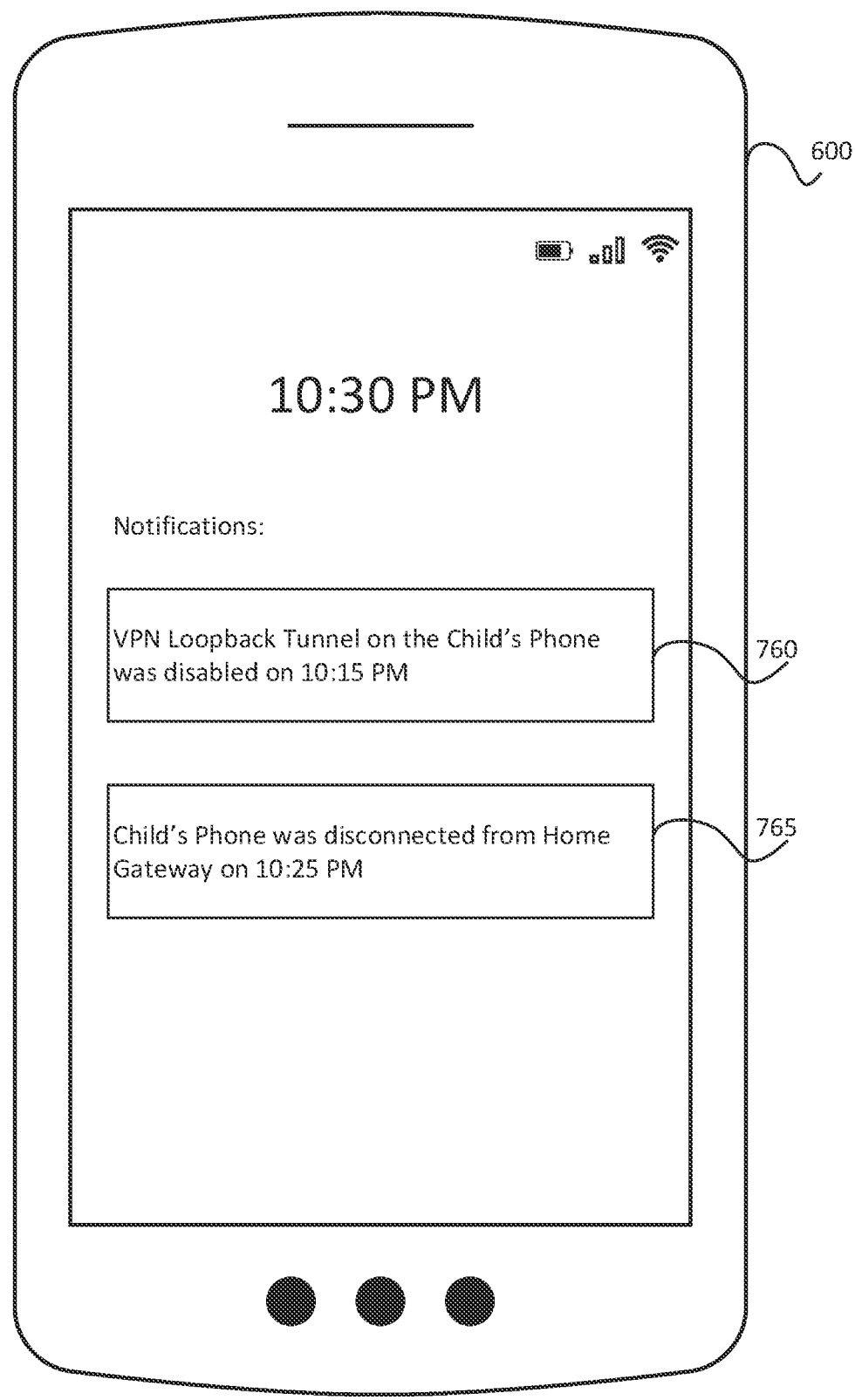

For example, FIG. 7D shows a screen display on the mom's phone 600. After the child went to bed at 9 PM, he got up secretly and attempted to play with his phone 118 at 10:10 PM. After he learned the Internet access was paused, he disabled the VPN loopback tunnel 340 on his phone 118 on 10:15 PM. He then disconnected his phone 118 from the gateway 111 and started to use a neighbor's Wi-Fi at 10:25 PM. Two alerts may be sent to the mon's phone. For example, alert 760 may indicate "VPN Loopback Tunnel on the Child's Phone was disabled on 10:15 PM." Alert 765 may indicate "Child's Phone was disconnected from Home Gateway on 10:25 PM." The mom may receive the two alerts and learn that the child is attempting to circumvent the network restriction.

Turning back to the determination made in step 465, if it is determined that the current VPN loopback tunnel 340 is still maintained, the method may proceed to step 485. In step 485, a determination may be made as to whether the controlled device 305 has been disconnected from the gateway 111.

The determination may be made by the gateway 111. For example, the gateway 111 may send out messages (e.g., ICMP messages) periodically to the controlled device 305 to request the controlled device 305 to confirm the connection is maintained, which may be similar to as described in step 475 above.

The determination may also or alternatively be made by the controlled device 305. For example, after the controlled device 305 disconnects from the gateway 111 and connects to a neighbor's gateway, the network address (e.g., IP address) may be changed. Since the VPN loopback tunnel 340 may be able to access the network stack of any requests that attempted to use the VPN loopback tunnel 340, the VPN loopback tunnel 340 may be able to detect the change of the network address of the controlled device 305 and therefore infer that the controlled device 305 may be disconnected from the gateway 111 and may be connected to a different gateway.

If it is determined that the controlled device 305 disconnects from the gateway 111, the method may proceed to step 490. In step 490, an alert may be sent to the controlling device 310. For example, the alert may be similar to the alert described in step 480.

If it is determined in step 485 that the controlled device 305 has not been disconnected from the gateway 111, or if step 490 is performed, the method may return back to step 450.

Turning back to the determination in step 465, if it is determined that a new VPN loopback tunnel 340 is established, the method may proceed to step 495. This may occur, for example, if the controlled device 305 connects to another gateway (e.g., the neighbor's gateway) that is different from the gateway 111 and is assigned a different network address (e.g., a different IP address). A new VPN loopback tunnel 340 may be established using the new network address. This may also occur, for example, if the user of the controlled device 305 manually establishes a new VPN loopback tunnel 340, hoping to circumvent the pause in the network access. In step 495, an alert may be sent to the controlling device 310 to indicate that the controlled device 305 has attempted to circumvent the pause in the network access. After the alert is sent, the method may return back to step 445. In step 445, an instruction to the new VPN loopback tunnel 340 to pause the network access of the controlled device 305 may be made.

One or more steps of the example, method 400 may be rearranged, omitted, and/or otherwise modified, and/or other steps may be added.

Figure 5:
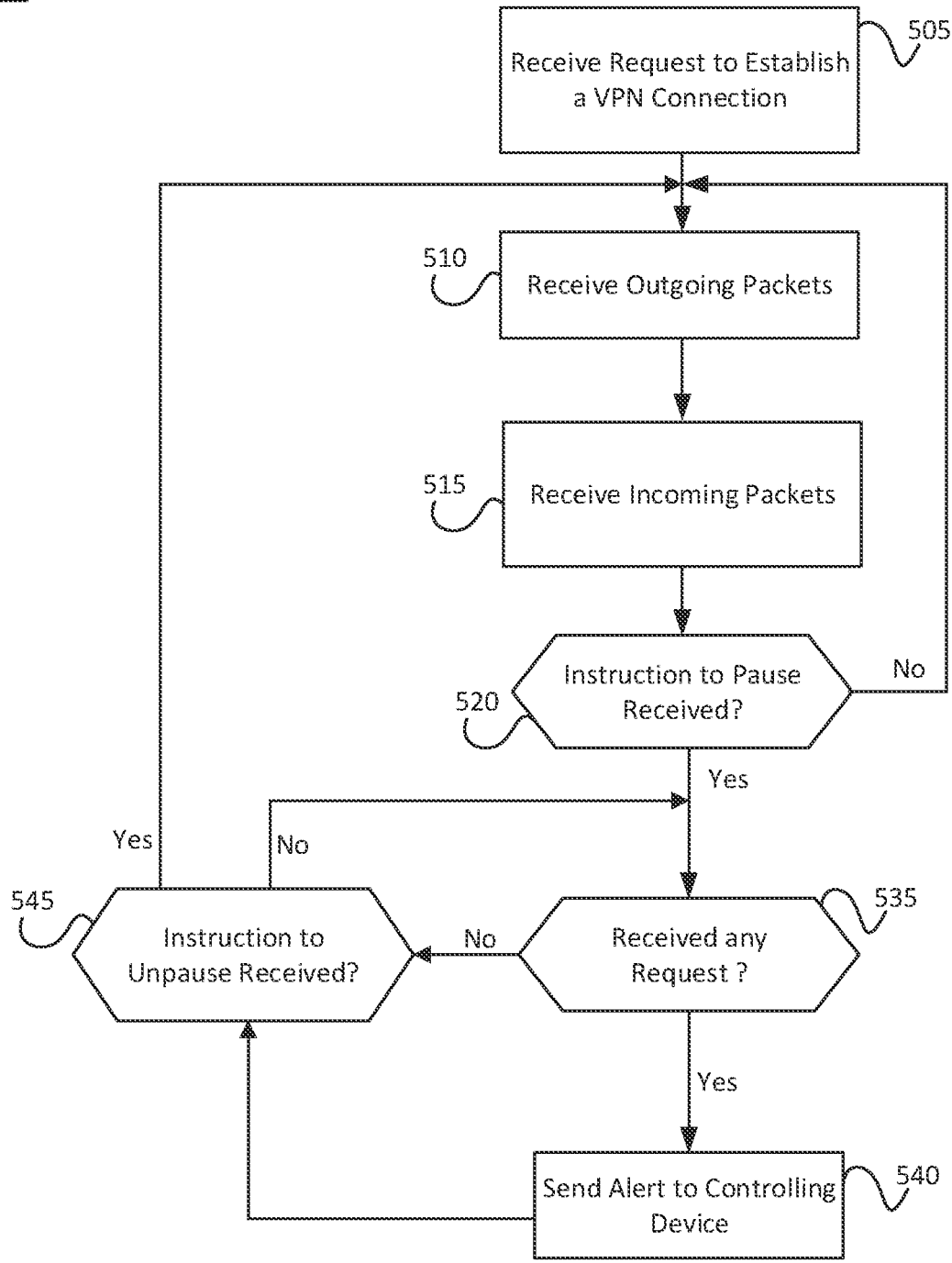
FIG. 5 is a flow chart showing another example method for network restriction circumvention management.

FIG. 5 depicts a flowchart showing another example method for network restriction circumvention management from the perspective of a data service, such as VPN server 122. Some or all of the steps of method 500 may be performed using one or more computing devices as described herein, for example, VPN server 122, VPN module 306, one or more computing devices 200, one or more computing devices in FIG. 1, or one or more computing devices in FIG. 3. For example, an account to subscribe to the network management service may be registered by the parent in premises 102a. One or more controlling devices 310, and one or more controlled devices 305, may be configured in a way similar to FIGS. 4A to 4B.

In step 505, a request may be received from a controlled device 305 to establish a VPN connection between the controlled device 305 and the VPN server 122. After such a VPN connection is established, the VPN server 122 may receive, from the controlled device 305 via the VPN connection, outbound packets with a destination source on the Internet. The VPN server 122 may send the packets to the source. The VPN server 122 may also receive inbound packets from the source to the controlled device 305 and may send the response to the controlled device 305 via the VPN connection. The inbound and outbound packets may be encrypted and/or decrypted based on ordinary VPN operations.

In step 510, outgoing packets sent from the controlled device 305 to a source on the Internet may be received. The packets may be processed by the VPN module 306 on the controlled device 305, for example, by being encrypted, and then sent to the VPN server 122 via the VPN connection. The VPN server 122 may process the outgoing packets according to normal VPN operation.

In step 515, incoming packets sent from a source on the Internet to the controlled device 305 may be received. The VPN server 122 may process the incoming packets according to normal VPN operation.

In step 520, a determination may be made as to whether an instruction to pause regarding the controlled device 305 is received. For example, the instruction to pause may be generated by the controlling device 310 in step 440, and then sent to the VPN server 122. If the instruction to pause is received, the VPN server 122 may determine to deny access to the controlled device 305, or to certain applications on the controlled device 305 if the restriction is application-specific, by not sending out inbound or outbound packets. However, packets may still be processed by VPN module 306 on the controlled device 305 the same way as it may be described in step 510 and then sent to the VPN server 122. In this way, VPN server 122 may exercise the network restriction. If the instruction to pause is received, step 535 may be performed.

In step 535, a determination may be made as to whether, while the instruction to pause remains in effect, any request that is associated with the controlled device 305 has been received by the VPN server 122. The request may comprise either a request to establish a new VPN connection, a request to send an outgoing packet to the Internet, or a request to send an incoming packet to the controlled device 305.

The request to establish a new VPN connection may occur if, when the instruction to pause is made, the controlled device 305 was connected to a gateway 111 that is associated with the network management system 300 (e.g., the gateway 111 described in FIG. 4A-4B). After the network access of the controlled device 305 was paused, the controlled device 305 may disconnect from the gateway 111 and then connect to another local access point that is not associated with the network management system 300 (e.g., a cellular network base station or a neighbor's Wi-Fi gateway). After the controlled device 305 switches to the other local access point, in order to continue using the VPN server 122 as a proxy, the VPN module 306 on the controlled device 305 may send a request to the VPN server 122 to establish a new VPN connection, since the IP address or other information of the controlled device 305 may have been changed. If the VPN server 122 receives a new request to establish a new VPN connection 340 for the controlled device 305, the VPN server 122 may determine, based on the request and the instruction to pause, that the controlled device 305 is attempting to circumvent the local network restriction.

A request to send a packet to the Internet may occur if, when the instruction to pause was made, the controlled device 305 was connected to a local access point that is not associated with the network management system 300. The VPN server 122 may deny sending the request out.

If any of the request described above is received by the VPN server 122, step 540 may be performed. In step 540, an alert may be sent to the controlling device 310 indicating that the controlled device 305 has attempted to access the Internet during the time period when the access is paused.

An alert may also be sent if the controlled device 305 detects the user's attempt to circumvent the network restriction by other approaches. For example, the user of the controlled device 305 may attempt to circumvent the network restriction by disconnecting from the VPN connection, so that packets may be sent to the Internet directly without being sent to the VPN server 122. If it is determined that the VPN settings are changed or attempted to be changed, for example, if it is determined that the network connection management application 314 is logged in, the VPN connection is disconnected, and/or the network connection management application 314 is uninstalled, the alert may be sent.

If no request is received from the controlled device 305 in step 535, or after an alert has been sent to the controlling device 310 in step 540, then step 545 may be performed. In step 545, a determination may be made as to whether an instruction to unpause the network access of the controlled device 305 is received. If the instruction to unpause is received, the network access may be reallowed, and the method may return back to step 510. One or more steps of the example, method 500 may be rearranged, omitted, and/or otherwise modified, and/or other steps may be added.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only and is not limiting.

The invention claimed is:

1. A method comprising:
    sending, by a controlling device and to a gateway, a first message with an instruction to pause network access by a controlled device that is communicatively connected to a wireless network managed by the gateway; and
    receiving, based on the controlled device no longer being connected to the gateway, by the controlling device, from the gateway, and after sending the first message, a second message comprising:
    data indicating that the controlled device is no longer connected to the gateway; and
    data indicating an identity of the controlled device.

2. The method of claim 1, wherein the second message further comprises data indicating the controlled device has attempted to use a virtual private network (VPN) loopback tunnel during the pause in the network access.

3. The method of claim 1, further comprising:
    receiving, by the controlling device and from the gateway, a third message indicating that the controlled device has connected to a different gateway.

4. The method of claim 1, further comprising:
    receiving, by the controlling device and from the gateway, a third message indicating the controlled device has attempted to circumvent the pause in the network access by disabling a virtual private network (VPN) loopback tunnel associated with the controlled device.

5. The method of claim 1, wherein the instruction to pause is configured to cause the gateway to pause network access by a first application without pausing network access by a second application.

6. The method of claim 1, further comprising receiving, by the controlling device and from the gateway:
an indication that a new device has requested to connect to the gateway; and
a prompt, for a user of the controlling device, to configure network pause settings for the new device.

7. The method of claim 1, further comprising, while the pause remains in effect, causing, by the controlling device, output of at least one of:
an indicator that the controlled device is disconnected from the gateway; or
an indicator that a VPN loopback tunnel associated with the controlled device is disabled.

8. A method comprising:
establishing, by a controlled device, a virtual private network (VPN) tunnel;
receiving, by the controlled device, an instruction to pause a network access, by the controlled device, to a wireless network;
determining, by the controlled device and after the controlled device is disconnected from the wireless network, that an application on the controlled device has requested to use the VPN tunnel; and
sending, by the controlled device based on the determining, an alert that indicates the controlled device has attempted to circumvent the pause in the network access by disconnecting from the wireless network, wherein the alert comprises data indicating a time when the controlled device is disconnected from the wireless network.

9. The method of claim 8, wherein the VPN tunnel begins at the controlled device and ends at the controlled device.

10. The method of claim 8, further comprising:
declining, by the controlled device and based on a determination that the pause remains in effect, the requested use of the VPN tunnel.

11. The method of claim 8, wherein the instruction to pause indicates a request to pause network access by a first application of the controlled device, and wherein the method further comprises:
declining, by the controlled device and while the pause remains in effect, a network request from the first application; and
approving, by the controlled device and while the pause remains in effect, a second network request from a second application of the controlled device.

12. The method of claim 8, further comprising:
determining, by the controlled device, that the controlled device has connected to a different gateway while the pause remains in effect; and
sending, by the controlled device, a second alert that indicates the controlled device has attempted to circumvent the pause in the network access.

13. The method of claim 8, further comprising:
determining, by the controlled device, that a network address of the controlled device has changed after receiving the instruction; and
sending, by the controlled device, a second alert that indicates the controlled device has attempted to circumvent the pause in the network access.

14. The method of claim 8, further comprising:
determining, by the controlled device, the VPN tunnel is disabled; and
sending, by the controlled device, a second alert that indicates the controlled device has attempted to circumvent the pause in the network access.

15. The method of claim 8, further comprising:
receiving, by the controlled device and while the instruction to pause remains in effect, an unpause instruction; and
allowing, by the controlled device, the unpause instruction to pass through the VPN tunnel.

16. The method of claim 8, further comprising:
determining, by the controlled device, that a second VPN tunnel has been established by the controlled device; and
sending, by the controlled device and based on a determination that the pause remains in effect, a second instruction to instruct the second VPN tunnel to decline requests to use the second VPN tunnel.

17. A method comprising:
receiving, by a gateway and from a first user device, an instruction to pause a network access of a second user device that is connected to the gateway;
determining, by the gateway and while the pause remains in effect, that the second user device is no longer connected to the gateway; and
sending, based on the second user device no longer being connected to the gateway, by the gateway, and to the first user device, a first alert indicating that the second user device has disconnected from the gateway.

18. The method of claim 17, wherein determining the second user device has disconnected from the gateway comprises:
sending, from the gateway and to the second user device, a message to confirm a connection between the gateway and the second user device; and
determining, by the gateway, that no response to the message is received from the second user device during a time period.

19. The method of claim 17, further comprising:
receiving, by the gateway and from a new device, a request to connect to the gateway; and
sending, by the gateway, to a controlling device, and based on the request:
an indication that the new device has requested to connect to the gateway; and
a prompt to configure network pause settings for the new device.

20. The method of claim 17, wherein the instruction to pause indicates a request to pause network access by a first application of the second user device, and wherein the method further comprises:
declining, by the gateway and while the pause remains in effect, a first network request from the first application; and
approving, by the gateway and while the pause remains in effect, a second network request from a second application of the second user device.

21. The method of claim 1, wherein the second message further comprises data indicating a time when the controlled device is disconnected from the gateway.

* * * * *